(12) United States Patent
Levanon et al.

(10) Patent No.: US 6,850,235 B2
(45) Date of Patent: Feb. 1, 2005

(54) EFFICIENT IMAGE PARCEL TEXTURE RENDERING WITH T-JUNCTION CRACK ELIMINATION

(75) Inventors: Isaac Levanon, Ramat Hasharn (IL); Yoni Lavi, Raanana (IL)

(73) Assignee: Fly Over Technologies Inc., Rannana (IL)

(*) Notice: Subject to any disclaimer, the term of this patent is extended or adjusted under 35 U.S.C. 154(b) by 363 days.

(21) Appl. No.: 10/036,193

(22) Filed: Dec. 24, 2001

(65) Prior Publication Data

US 2002/0145606 A1 Oct. 10, 2002

Related U.S. Application Data

(60) Provisional application No. 60/258,488, filed on Dec. 27, 2000, provisional application No. 60/258,489, filed on Dec. 27, 2000, provisional application No. 60/258,468, filed on Dec. 27, 2000, provisional application No. 60/258,466, filed on Dec. 27, 2000, provisional application No. 60/258,467, filed on Dec. 27, 2000, and provisional application No. 60/258,465, filed on Dec. 27, 2000.

(51) Int. Cl.$^7$ .............................................. G06T 17/20
(52) U.S. Cl. ..................................................... 345/423
(58) Field of Search ................................ 345/423, 418, 345/419, 420

(56) References Cited

U.S. PATENT DOCUMENTS

| 6,057,848 | A  | * | 5/2000  | Goel ............................ 345/423 |
| 6,211,883 | B1 | * | 4/2001  | Goel ............................ 345/423 |
| 6,359,629 | B1 | * | 3/2002  | Hopcroft et al. ............ 345/620 |
| 6,618,049 | B1 | * | 9/2003  | Hansen ........................ 345/423 |
| 6,664,960 | B2 | * | 12/2003 | Goel et al. ................... 345/423 |
| 2002/0094926 | A1 | * | 7/2002 | Kling .......................... 493/356 |

* cited by examiner

Primary Examiner—Don Wong
Assistant Examiner—HueDung X. Cao

(57) ABSTRACT

Defects are removed from a tessellated polygonal mesh provided for the rendering of polygon corresponding image parcels through a process that first determines, for a predetermined segment of a first edge of a first polygon within the polygonal mesh, a difference in tessellation level between the first polygon and a second polygon disposed adjacent the predetermined edge of the first polygon, subject to the occurrence of a defect in the polygonal mesh between the first and second polygons. A terminus of the predetermined segment is then computed based on the difference in the tessellation levels and a new vertex, corresponding to the terminus, is added to a first set of vertices that define the first polygon. An image parcel can then be rendered based on the set of vertices, including the added vertex, such that the first image parcel as rendered covers the defect in the polygonal mesh between the first and second polygons.

20 Claims, 5 Drawing Sheets

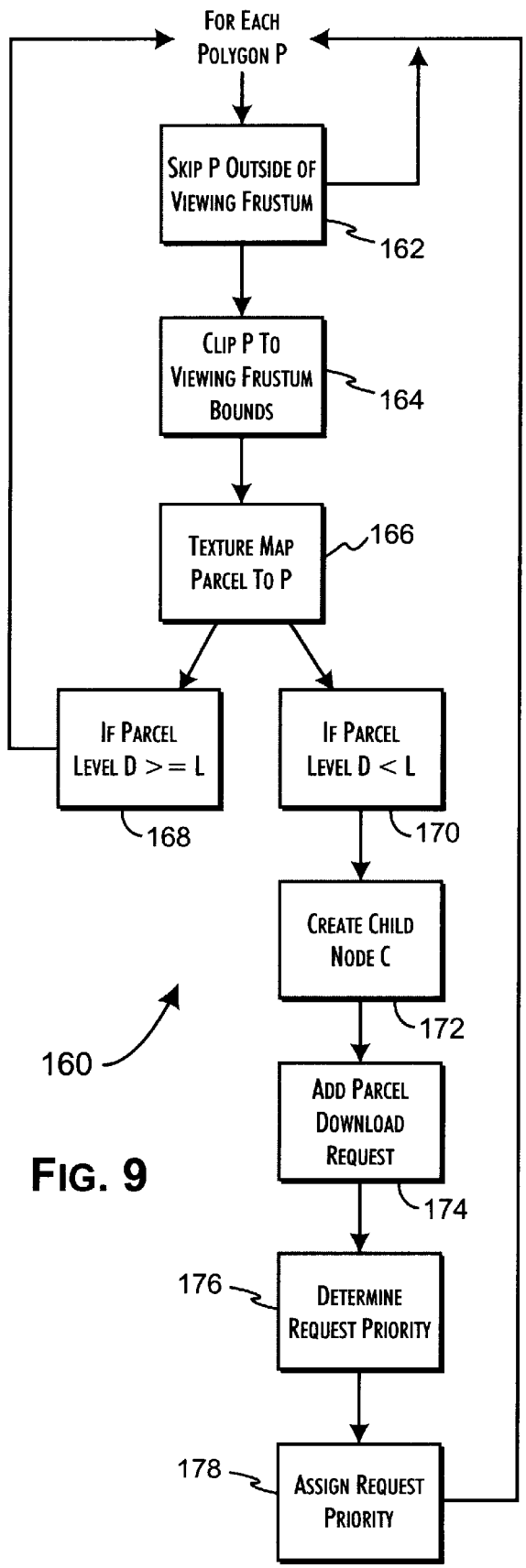
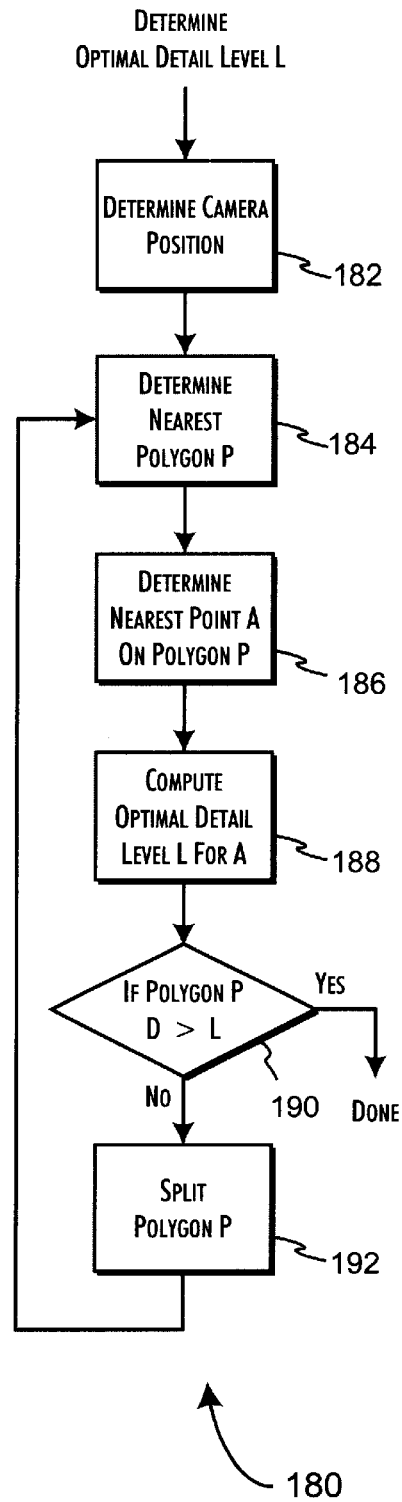
FIG. 9
FIG. 10

EFFICIENT IMAGE PARCEL TEXTURE RENDERING WITH T-JUNCTION CRACK ELIMINATION

This application claims the benefit of U.S. Provisional Application Nos. 60/258,488, 60/258,489, 60/258,465, 60/258,468, 60/258,466, and 60/258,467, all filed Dec. 27, 2000.

CROSS-REFERENCE TO RELATED APPLICATIONS

The present application is related to the following Application, assigned to the Assignee of the present Application:

BACKGROUND OF THE INVENTION

1. Field of the Invention

The present invention is generally related to the graphical rendering of image data over surfaces defined by polygon meshes and, in particular, to a system and methods of efficiently regularizing a polygon mesh having multiple tessellation levels to support image parcel texture rendering without visual T-junction artifacts.

2. Description of the Related Art

Substantial advances have been mode in the computer-based algorithms for rendering surface textures over complex manifolds to obtain visually realistic presentations of graphic images. Conventional, image data-set processing techniques permit the generation of photo-realistic views of objects within virtual environments embodying multiple radiosity sources and correspondingly complex shading patterns.

There are, however, several known problems with conventional image data-set processing and rendering algorithms, particularly where the image processing is desirably performed to provide real-time or near real-time rendering of the image in support of visual interactivity with the continuously displayed image. These problems include various types of data degeneracies and discontinuities introduced by the origin and nature of the source image data. Other problems arise from the dynamic processing of image data sets in support of real-time rendering of the image, which produce defects or voids in the topological surface of the displayed image. Such defects, directly perceived as visual artifacts in the image, are of particular significance, since the existence of a uniform manifold is typically presumed for conventional radiosity, shading, and similar algorithms. A radiosity error arising from even a small topological defect can greatly amplify the perceptual significance of the defect and significantly compromise the visual value of the displayed image.

Real-time and near real-time image presentation algorithms often employ a multi-resolution hierarchy generation scheme to optimize the perceptual value of the displayed image. Image parcels are displayed at different resolutions in a manner that correlates the level of detail of different image parcels with the perceptual significance of the informational content of the parcels. In general, image parcels of that appear closer to the image view point are considered to have a higher relevant informational content and are therefore desirably rendered with a higher resolution. Image parcels virtually further from the image view point are displayed variously with lower resolutions, thereby reducing computational complexities associated with the rendering process and in turn enhancing the real-time or near real time display of the image.

Conventionally, image parcels are rendered using various texture mapping algorithms based on polygonal meshes used to topologically define the image surface. The discrete vertices of the polygonal mesh are established in a regular distribution over an image parcel map based on some typically non-linear height function, such as a digital elevation mode (DEM) function, derived from the image data. Image parcels, correlated to locations within the image parcel map, are texture mapped into overlying mesh polygons to render the corresponding portion of the image surface.

Irregularities in a polygonal mesh, leading to the occurrence of surface defects, can be introduced from multiple sources, including variances and discontinuities in the source image data and the various algorithms used to define the mesh. Topology and geometry simplification algorithms variously employed to improve the perceived quality of the displayed image and to regularize the image data to reduce the computational complexity of image data rendering can also create mesh irregularities. Mesh irregularities can also be introduced through the generalized rendering process, such as when using multi-resolution hierarchy display process.

Polygonal mesh irregularities generally result in image defects, usually referred to as cracks, that occur due to the imperfect alignment of mesh vertices. Mis-alignments result in the evaluation of different height function values along the opposing boarders of adjacent image parcels. Depending on the current image projection angle, the rendering of the adjacent image parcels based on the mis-aligned adjacent polygons leaves a visible topological void in the image surface.

In the particular case of multi-resolution images, cracks commonly if not all too frequently occur on the polygon mesh boarders between image parcels of different resolutions. The dissimilar intervals between mesh vertices frequently results in the occurrence of T-junctions, defined as the occurrence of a boarder vertex in a higher resolution mesh dissociated from any corresponding boarder vertex in the lower-resolution mesh. Again depending on the image projection angle, a crack occurs due to the difference in the height function evaluated along the bordering image parcel polygons, typically with a maximum associated with the T-junction vertex.

The correction of image defects, such as arising from T-junction cracks, is necessary to preserve the integrity and visual realism of a displayed image. Efficient correction is also required to maintain the capability to perform real-time image presentation and interactive manipulation of the image. Different algorithms have been proposed and variously implemented to correct image defects, including cracks, systematically or by detecting, categorizing, and specifically correcting the underlying image data.

In *Topology Simplification for Polygonal Virtual Environments*, Jihad El-Sana and Amitabh Varshney, IEEE Trans. Visualization and Computer Graphics, 4(2):133–144, April–June 1998, a genus algorithmic approach to implementing topological simplifications for removing holes and protuberances is described. The approach implements the conceptual sweeping of an α-shape over an image corresponding polygonal mesh and processing the underlying image data to selectively add and remove data triangulations that variously correspond to the filling of topological holes and smoothing of topological protuberances.

Conventional boundary-oriented approaches to categorizing and correcting image defects variously attempt to re-fit mesh irregularities that represent voids by variously shifting vertices to merge boundaries and clustering vertices, including merging pairs of vertices, that are within some defined error range. In *Consistent Solid and Boundary Representations from Arbitrary Polygonal Data*, Murali, T. M. and Thomas A. Funkhouser, Proceedings of 1997 Symposium on Interactive 3D Graphics. April 27–30. pp. 155–162, 196, a solid modeling approach is described that evaluates the image data to develop a set of solid regions that are in turn used to generate a correct triangulation enclosing the solid regions, thereby providing a correct basis for defining a topological surface necessary to close a void with a correct orientation. Still other algorithms propose various numerical approximation and curve fitting algorithms operating over the image data to support the addition of multiple polygons to fill simple to complex void forms.

In general, however, all of these conventional approaches tend to be highly compute intensive and tend to require a significant evaluation of the underlying image data. In circumstances where a high degree of interactivity is desired, particularly where the available computing resources may be limited, use of such conventional approaches may limit the perceived quality of the rendered image or reduce interactive response to qualitatively undesirable levels.

Given the ever increasing pervasiveness of computing through portable and appliance devices, there is a clear desire to maintain if not improve the image quality and interactively achievable in connection with the rendering of topological surfaces, particularly where computer performance and memory resources may be limited.

SUMMARY OF THE INVENTION

Thus, a general purpose of the present invention is to provide for the efficient regularizing of polygonal meshes, including particularly those representing multi-resolution hierarchical images, to eliminate subsequent occurrence topological surface defects.

This is achieved in the present invention by providing for the removal of defects from a tessellated polygonal mesh provided for the rendering of polygon corresponding image parcels through a process that first determines, for a predetermined segment of a first edge of a first polygon within the polygonal mesh, a difference in tessellation level between the first polygon and a second polygon disposed adjacent the predetermined edge of the first polygon, subject to the occurrence of a defect in the polygonal mesh between the first and second polygons. A terminus of the predetermined segment is then computed based on the difference in the tessellation levels and a new vertex, corresponding to the terminus, is added to a first set of vertices that define the first polygon. An image parcel can then be rendered based on the set of vertices, including the added vertex, such that the first image parcel as rendered covers the defect in the polygonal mesh between the first and second polygons.

An advantage of the present invention is that polygonal meshes can be regularized particularly with respect to the occurrence of T-junction based topological surface defects. The mesh regularization involves a minimal introduction of new vertices and results in a minimal introduction of perceptible surface distortion.

Another advantage of the present invention is that different tessellation levels at different image parcel and image parcel set boundaries are directly handled. Cracks of complex form are thereby efficiently handled in the nominal operation of the present invention.

A further advantage of the present invention is that the implementing algorithm requires a minimal amount of computing performance and memory space for data structures, thereby providing a substantial improvement in the perceived quality of the displayed image while imposing only a relatively insignificant load on the available computing resources. The minimal processing requirements imposed by the present invention do not limit the real-time rendering of images.

Still another advantage of the present invention is that the implementing algorithms are easily integrated into the underlying image parcel management and rendering algorithms of conventional devices, including portable, wireless, and other pervasive computing devices that may have restricted computing resources.

BRIEF DESCRIPTION OF THE DRAWINGS

These and other advantages and features of the present invention will become better understood upon consideration of the following detailed description of the invention when considered in connection with the accompanying drawings, in which like reference numerals designate like parts throughout the figures thereof, and wherein:

FIG. 9 provides a process flow diagram detailing the rendering and progressive prioritization of image parcel data download requests in accordance with a preferred embodiment of the present invention; and FIG. 10 provides a process flow diagram detailing the vertex insertion routine implemented in a preferred embodiment of the present invention.

DETAILED DESCRIPTION OF THE INVENTION

While the present invention has equal applicability to multi-resolution image rendering processes implemented general independent of the nature and extent of available computing resources, the computational and memory efficiencies of the present invention are of particular utility when implemented to support the viewing of real-time rendered images in mobile, wireless, and other computing devices having characteristically limited computing performance and memory resources. Although the present invention will be described in connection with such preferred embodiments, the broader applicability of the present invention to support the real-time presentation of graphic images independent of the specific source or type of image data and by computing devices of all scales will be readily appreciated.

Figure 1:
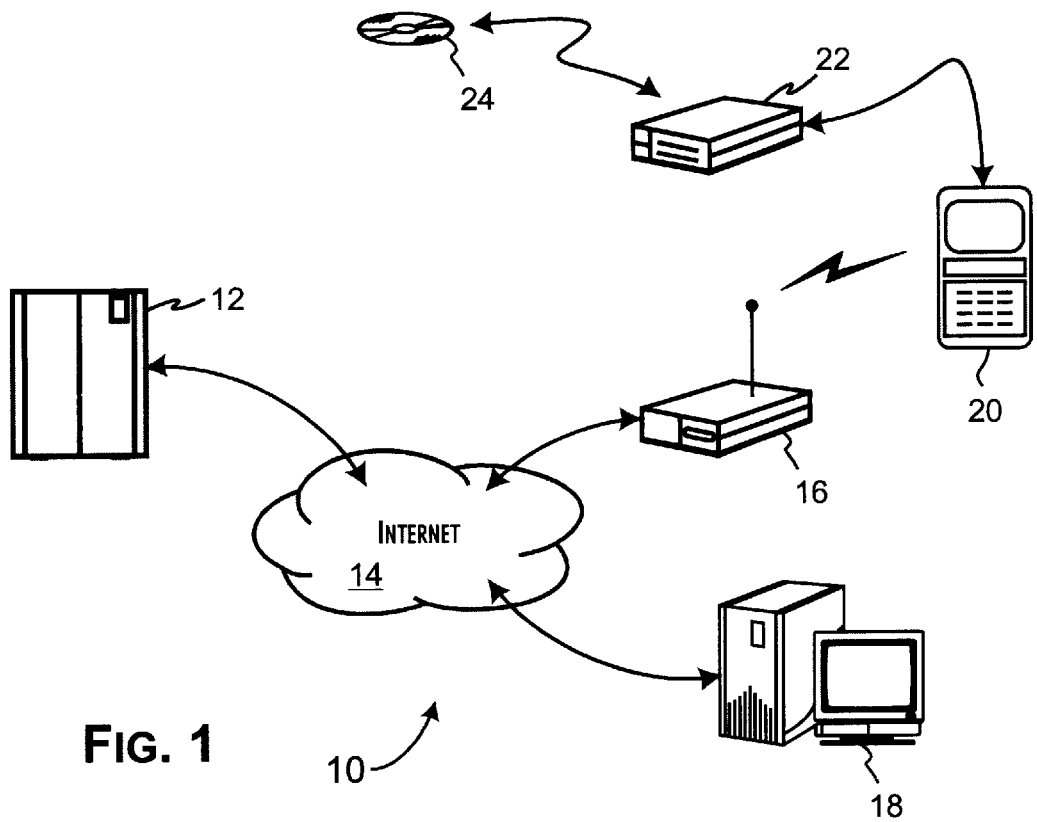
FIG. 1 depicts a preferred system environment within which various embodiments of the present invention can be utilized.

A preferred operational environment 10 of the present invention is generally shown in FIG. 1. A network server system 12, operating as a data store and server of image data, is responsive to requests received through a communications network, such as the Internet 14 generally and various tiers of internet service providers (ISPs) including a wireless connectivity provider 16. Client systems, including conventional workstations and personal computers 18 and smaller, typically dedicated function devices often linked through wireless network connections, such as PDAs, webphones 20, and automobile navigation systems, source image requests to the network server 12, provide a client display and enable image navigational input by a user of the client system. Alternately, a dedicated function client system 20 may be connected through a separate or plug-in local network server 22, preferably implementing a small, embedded Web server, to a fixed or removable storage local image repository 24. Characteristically, the client system 18, 20 displays are operated at some fixed resolution generally dependent on the underlying display hardware of the client systems 18, 20.

The image navigation capability supported by the present invention encompasses a viewing frustum placed within a three-dimensional space over the imaged displayed on the client 18, 20. Client user navigational inputs are supported to control the x, y lateral, rotational and z height positioning of the viewing frustum over the image as well as the camera angle of incidence relative to the plane of the image. To effect these controls, the software implemented on the client systems 18, 20 supports a three-dimensional transform of the image data provided from the server 12, 22.

Figure 2:
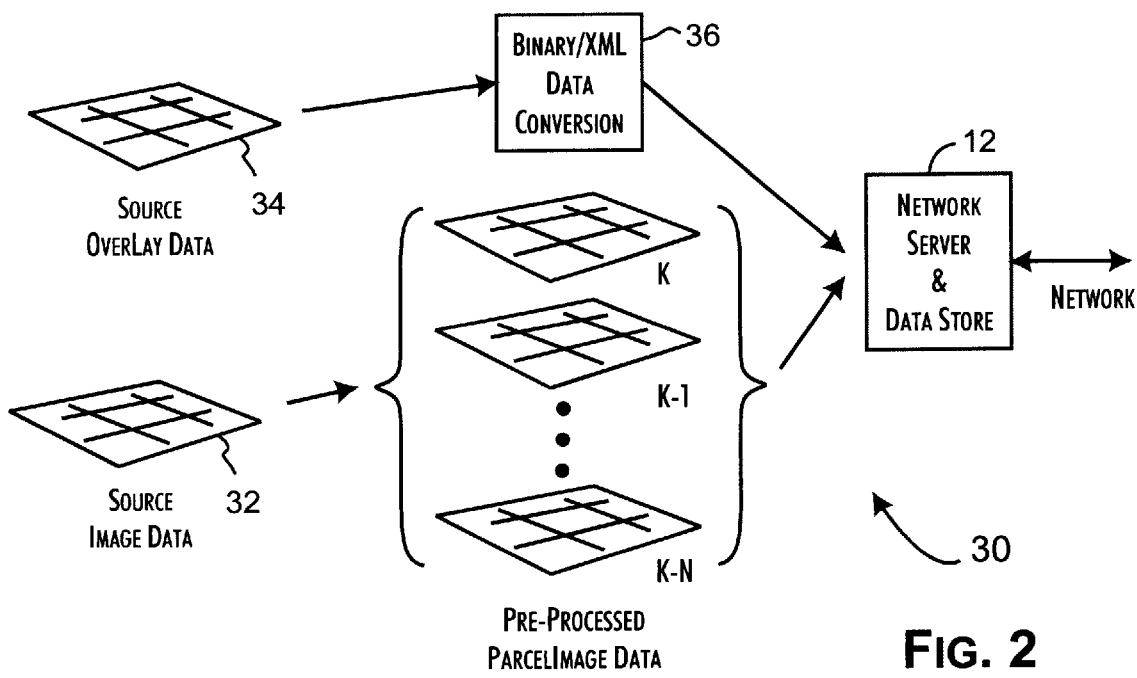
FIG. 2 is a block diagram illustrating the preparation of image parcel and overlay data set that are to be stored by and served from a network server system in accordance with a preferred embodiment of the present invention.

In accordance with the preferred embodiments of the present invention, as generally illustrated in FIG. 2, a network image server system 30 stores a combination of source image data 32 and source overlay data 34. The source image data 32 is typically high-resolution bit-map satellite imagery of geographic regions, which can be obtained from commercial suppliers. The overlay image data 34 is typically a discrete data file providing image annotation information at defined coordinates relative to the source image data 32. In the preferred embodiments of the present invention, image annotations include, for example, street, building and landmark names, as well as representative 2D and 3D objects, graphical icons, decals, line segments, and text and other characters.

The network image server system 30 preferably pre-processes the source image data 32 and source overlay data 34 to forms preferred for storage and serving by the network server 12, 22. The source image data 32 is preferably pre-processed to obtain a series $K_{1-N}$ of derivative images of progressively lower image resolution. The source image data 32, corresponding to the series image $K_0$, is also subdivided into a regular array such that each resulting image parcel of the array has a 64 by 64 pixel resolution where the image data has a color or bit per pixel depth of 16 bits, which represents a data parcel size of 8K bytes. The resolution of the series $K_{1-N}$ of derivative images is preferably related to that of the source image data 32 or predecessor image in the series by a factor of four. The array subdivision is likewise related by a factor of four such that each image parcel is of a fixed 8K byte size.

In the preferred embodiment of the present invention, the image parcels are further compressed and stored by the network server 12, 22. The preferred compression algorithm implements a fixed 4:1 compression ratio such that each compressed and stored image parcel has a fixed 2K byte size. The image parcels are preferably stored in a file of defined configuration such that any image parcel can be located by specification of a $K_D$, X, Y value, representing the image set resolution index D and corresponding image array coordinate.

The source overlay data 34 is preferably pre-processed 36 into either an open XML format, such as the Geography Markup Language (GML), which is an XML based encoding standard for geographic information developed by the OpenGIS Consortium (OGC; www.opengis.org), or a proprietary binary representation. The XML/GML representation is preferred as permitting easier interchange between different commercial entities, while the binary representation is preferred as more compact and readily transferable to a client system 18, 20. In both cases, the source overlay data 34 is pre-processed to contain the annotation data preferably in a resolution independent form associated with a display coordinate specification relative to the source image data 32. The XML, GML or binary overlay data may be compressed prior to storage on the network server 12, 22.

Figure 3:
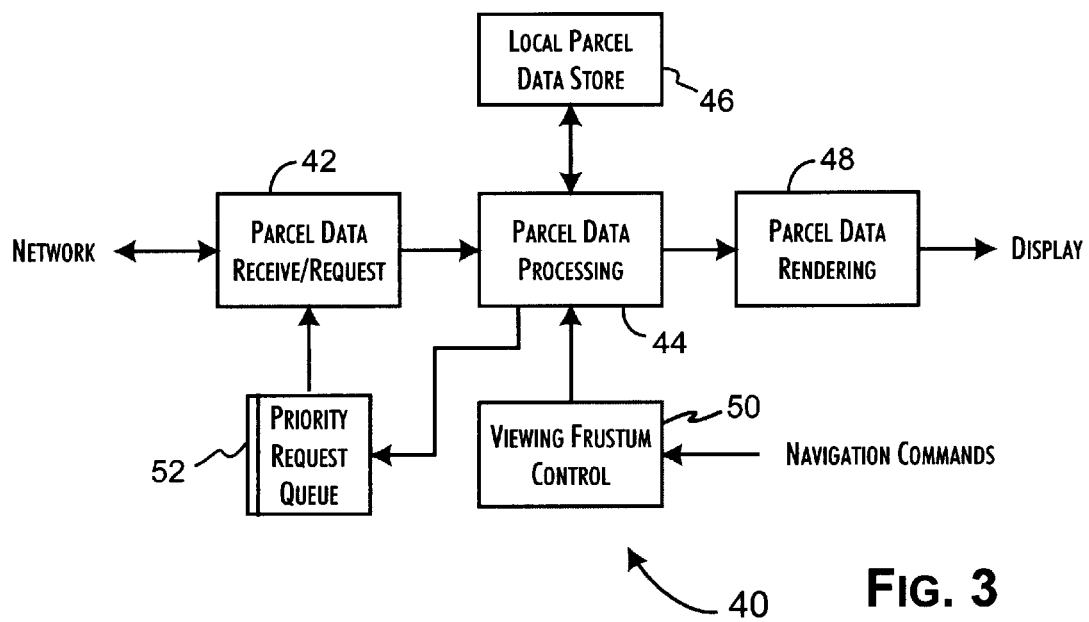
FIG. 3 is a block diagram of a client system image presentation system constructed in accordance with a preferred embodiment of the present invention.

The preferred architecture 40 of a client system 18, 20, for purposes of implementing the present invention, is shown in FIG. 3. The architecture 40 is preferably implemented by a software plug-in or application executed by the client system 18, 20 and that utilizes basic software and hardware services provided by the client system 18, 20. A parcel request client 42 preferably implements an HTML client that supports HTML-based interactions with the server 12, 22 using the underlying network protocol stock and hardware network interface provided by the client systems 18, 20. A central parcel processing control block 44 preferably implements the client process and control algorithms. The control block 44 directs the transfer of received image parcels and XML/GML/binary overlay data to a local parcel data store 46. Preferably image data parcels are stored in conventional quad-tree data structures, where tree nodes of depth D correspond to the stored image parcels of a derivative image of resolution KD. The XML/GML/binary overlay data is preferably stored as a data object that can be subsequently read by an XML/GML/binary parser implemented as part of the control block 44.

The control block 44 is also responsible for decompressing and directing the rendering of image parcels to a local display by a rendering engine 48. Preferably, the rendering engine 48 writes to the video memory of the underlying client display hardware relying on only generic graphics acceleration hardware capabilities. In general, the relied on capabilities include bit-blt and related bit-oriented functions that are readily supported by current conventional display controller hardware. The rendering engine 48 is optimized to perform image parcel texture mapping without reliance on complex floating point operations, permitting even relatively simple processors to efficiently execute the rendering engine 48.

Changes in the viewing frustum are determined from user input navigation commands by a frustum navigation block 50. In the preferred embodiments of the present invention, the input navigation controls are modeled for three-dimensional fly-over navigation of the displayed image. The navigation controls support point-of-view rotation, translation, attitude, and altitude over the displayed image. The effective change in viewing frustum as determined by the frustum navigation block 50 is provided to the control block 44.

The control block 44, based in part on changes in the viewing frustum, determines the ordered priority of image parcels to be requested from the server 12, 22 to support the progressive rendering of the displayed image. The image parcel requests are placed in a request queue 52 for issuance by the parcel request client 42. Preferably, the pending requests are issued in priority order, thereby dynamically reflecting changes in the viewing frustum with minimum latency.

Figure 4:
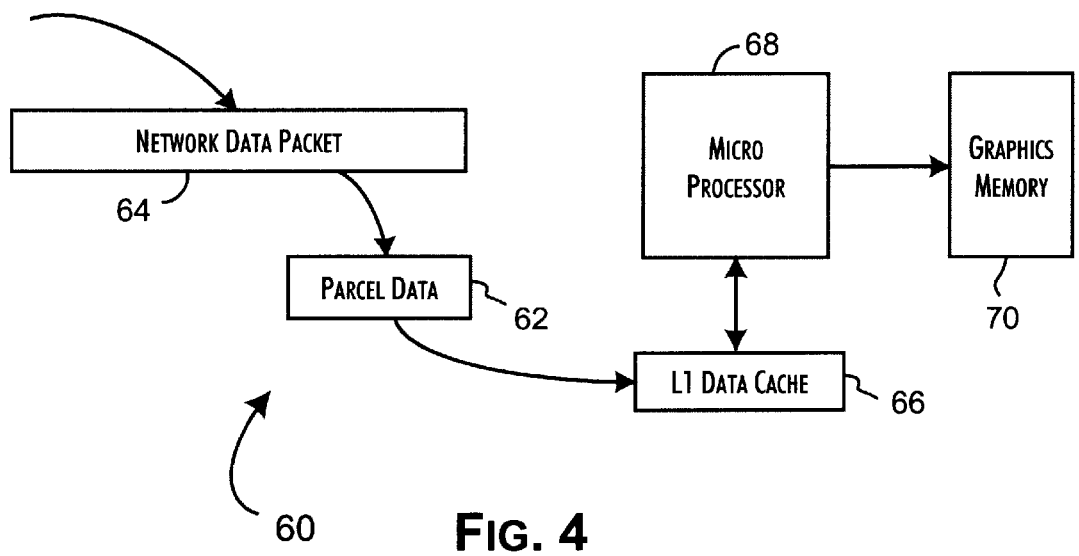
FIG. 4 provides an isometric view of a tessellated polygonal mesh including a defect of a type correctable through the operation of a preferred embodiment of the present invention.

The multi-resolution image data, K, $K_1$–$K_N$, provided by the network server 12, 22 permits the progressive rendering of an image defined by the current viewing frustum, subject to the presentation of the image data at multiple tessellation levels. As generally shown in FIG. 4, adjacent regions of the polygonal mesh 60, represented by the vertices $V_{A-D}$ and $V_{C-F}$, defining corresponding portions of the virtual sectional elevation of the image, will have different tessellation levels D2, D3. Due to the difference in tessellation, the elevation at a vertex $V_K$ can result in the occurrence of a T-junction crack defined by the vertices $V_{CDK}$. Thus, depending on the image orientation relative to the viewing frustum, the separate rendering of image parcels over the polygons $V_{C-F}$, $V_{CKHJ}$, and $V_{DIHK}$ leaves a void within the image space defined by the vertices $V_{CDK}$, resulting in a visual defect in the image as rendered.

Figure 5:
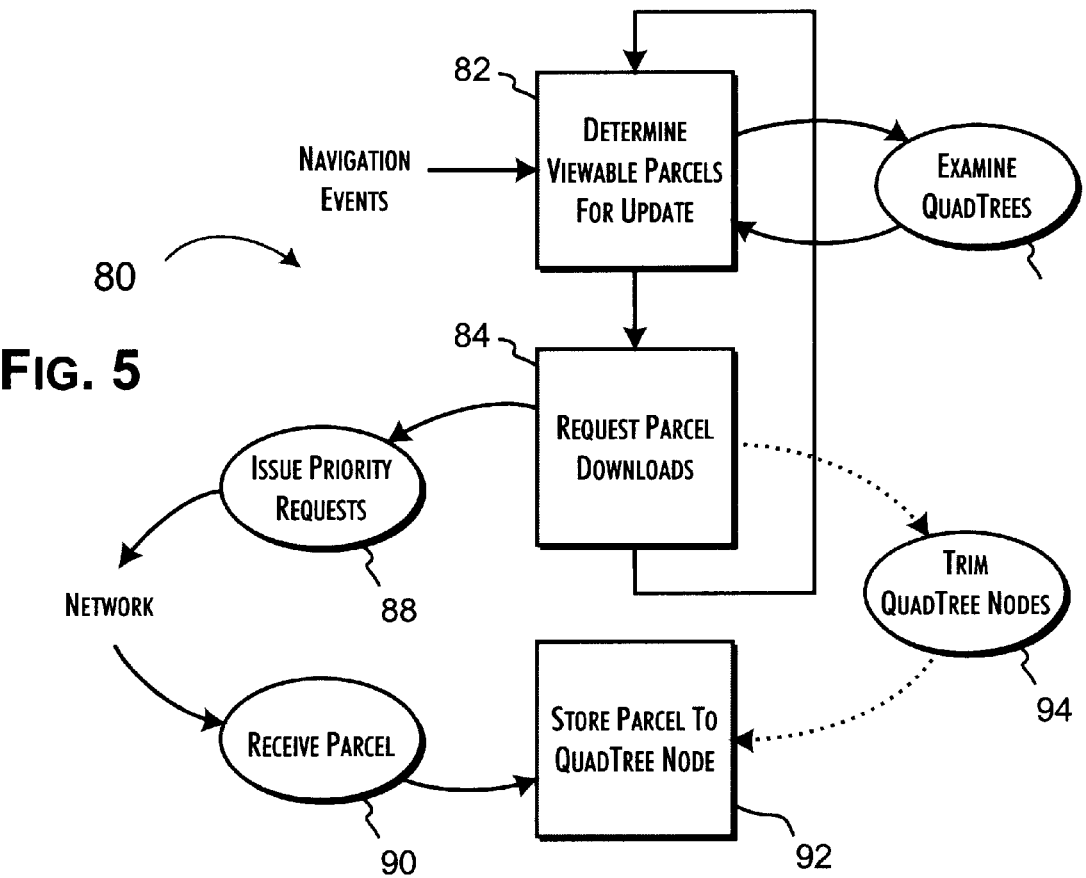
FIG. 5 provides an isometric view of the tessellated polygonal mesh shown in FIG. 4 including the insertion of a new vertex and showing a possible triangular fan decomposition of a polygon for rendering of an image parcel in accordance with a preferred embodiment of the present invention.

In accordance with the present invention, the tessellated polygonal mesh 60 is regularized to form a mesh 70, as shown in FIG. 5, by the selective addition of a vertex $V_L$ to the set of vertices that define the D2 polygon $V_{C-F}$. In the preferred embodiments of the present invention, the location of the vertex $V_L$ is chosen to lie on the edge $V_{CD}$ at a point correlated to the vertex $V_L$ such that, in subsequent render processing of the polygon $V_{CLDEF}$, the vertex $V_L$ will be merged, based on proximity, with the vertex $V_K$. The further render processing of the mesh 70 preferably results in the decomposition of the polygon $V_{CLDEF}$ into a triangle fan that includes the vertex $V_K$, generally as shown. Thus, for the regularized mesh 70, the rendered texture for the polygon $V_{C-F}$ is rendered to cover the polygon $V_{CLDEF}$. While such rendering does involve the rendering of an additional triangle surface and potentially introduce a distortion of the rendered texture, the $V_{CDK}$ void is completely covered. The number of additional triangles to be rendered, however, is minimal and any distortion introduced is insignificant considering that the visual defect is completely removed.

Figure 6:
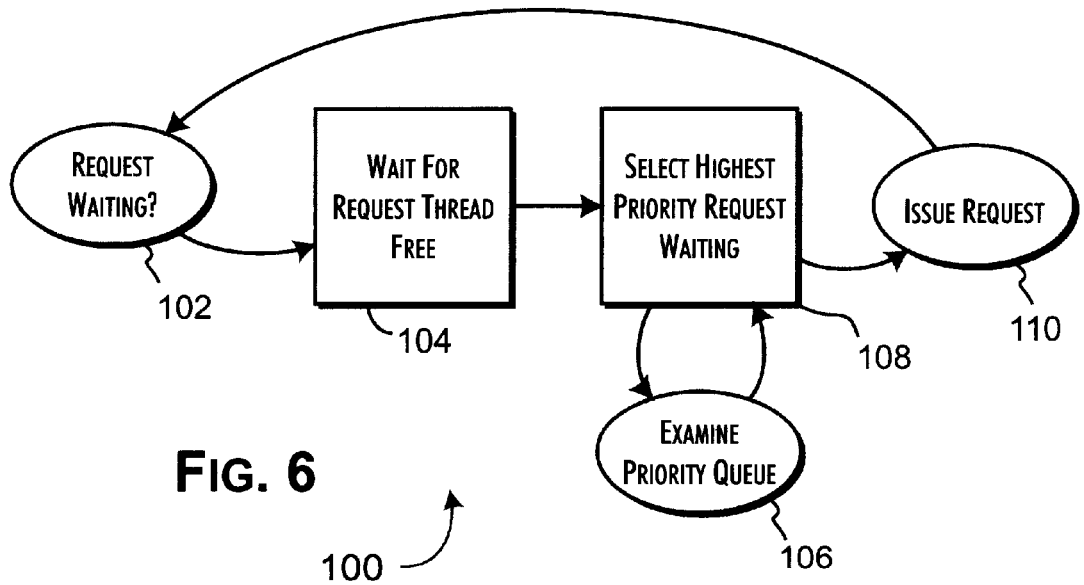
FIG. 6 provides a representative top view of the isometric view provided in FIG. 5.

Referring to FIG. 6, a portion of the polygonal mesh 70 from a representative top view 80 is shown. For the preferred embodiments of the present invention, the correlation of the location of the vertices $V_K$ and $V_L$ is such that the vertices are coexistent in a two-dimensional projection of the mesh 70. As such, the merging of the vertices $V_K$ and $V_L$ imposes little or no additional overhead in the rendering process.

Figure 7:
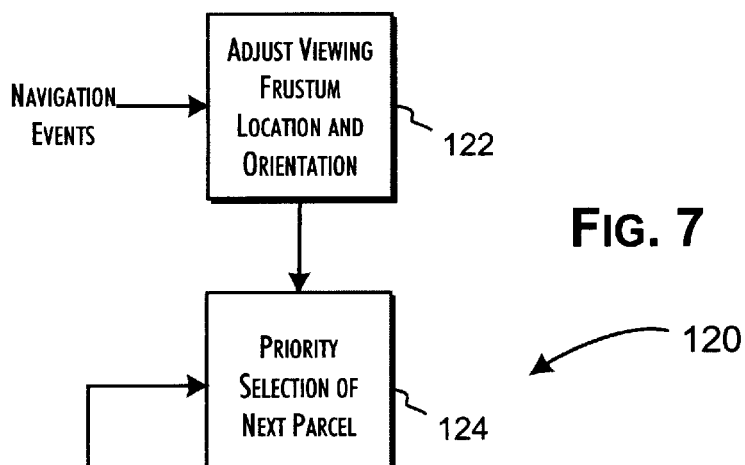
FIG. 7A provides a representative top view of a tessellated polygonal mesh with multiple relative levels of tessellation and a possible triangular fan decomposition of a polygon for rendering of an image parcel in accordance with a preferred embodiment of the present invention.
FIG. 7B provides a representative view of a tessellation map data structure corresponding to the tessellated polygonal mesh shown in FIG. 7A.

FIG. 7A illustrates a regularized polygonal mesh 90 with multiple tessellation levels. As shown, a polygon $V_{ABCD}$ is adjacent regions of the mesh 90 that are of one and two levels of tessellation greater than that of the polygon $V_{ABCD}$. In accordance with the present invention, vertices $V_{E-H}$ are added at points on the edges of the polygon $V_{ABCD}$ correlated to the location of each T-junction forming vertex that occurs in the regions of higher tessellation. A possible rendering triangle decomposition, following merger of correlated vertices, is also indicated.

To minimize the computational complexity of locating potential T-junction vertices, the present invention preferably provides for the generation and use of a tessellation map 100, representationally shown in FIG. 7B. The resolution of the tessellation map 100 preferably corresponds to the mesh resolution of some optimally maximum resolution image data L in $K_{0-N}$ that will be displayed by the client system 18, 20. The entries in the tessellation map 100 thus have a unique positional correspondence with the smallest image area that can be covered by an image parcel at the maximum display image resolution level L. As shown for the polygonal mesh 90, a corresponding portion 102 of the tessellation map 100 represents the tessellation levels of the rendering polygons, where the maximum resolution level L is six.

In the preferred embodiments of the present invention, tessellation levels of the multi-resolution image are within the range of 0 to 15. Thus, the tessellation map 100 is allocated as a nibble array of size (x/64, y/64), where (x,y) is the resolution of the image at level L. Lower resolution image parcels of a depth D will be represented by map positionally corresponding entries in an area of the tessellation map 100 of size (pow(2,L-D),pow(2,L-D)). All entries in the covered region of the tessellation map 100 will have the same value.

While the tessellation map 100 logically contains an entry for each possible polygon, the tessellation map 100 data structure as preferably maintained in-memory by the present invention is limited to those image parcels retrieved to a client system 18, 20, particularly where the local memory resource is limited. Thus, the tessellation map 100 data structure is grown as the area of covered by received image parcels increases and correspondingly reduced as coverage is reduced as image parcels are released from local memory.

Figure 8:
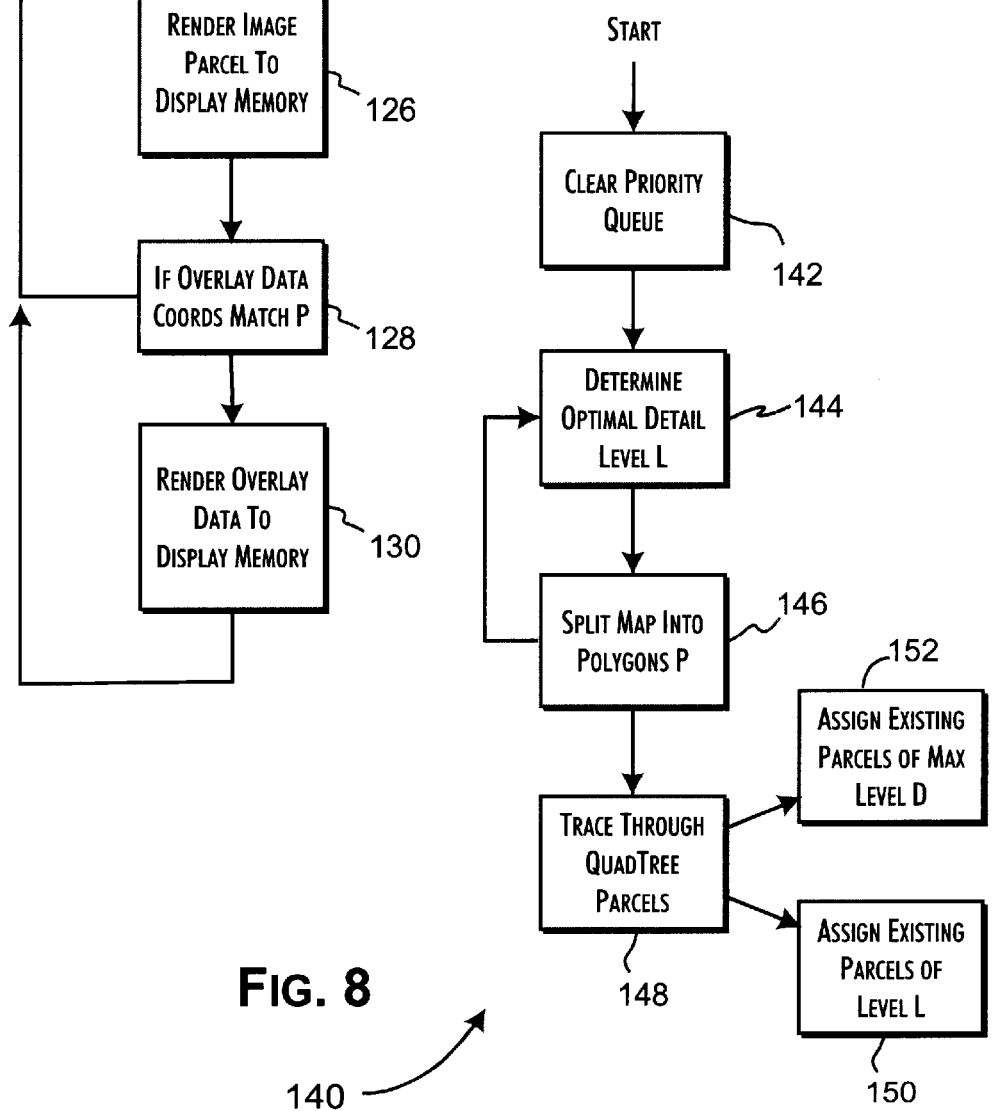
FIG. 8 provides a process flow diagram showing the parcel and tessellation map processing performed preliminary to the rendering of image data parcels in accordance with a preferred embodiment of the present invention.

In a preferred embodiment of the present invention, the tessellation map 100 is preferably initialized through a process 110, as shown in FIG. 8, on startup on in response to a change in the viewing frustum location and orientation. The tessellation map 100 is initially created as needed and the map entries are cleared 112. The effective altitude of the viewing frustum and the resolution of the client display are then used as a basis for determining an optimal level of detail L that will be displayed. The detail level L value operates as a floor w defining the maximum resolution $K_L$ of image data that can be effectively viewed on the client display given the location and orientation of the viewing frustum. Constraining image parcel requests to the resolution range $K_N$ to $K_L$, where $K_N$ is the lowest resolution derivative image stored by the network server 12, 22, prevents the download and processing of image parcels that cannot provide any perceptible improvement in the displayed image.

The preferred algorithm 114 for determining the detail level L value for a given viewing frustum is described in U.S. patent application Ser. No. 10/035,981 filed Aug. 9, 2004, entitled System and Methods for Network Image Delivery with Dynamic Viewing Frustum Optimized for Limited Bandwidth Communication Channels, Levanon et al., which is assigned to the assignee of the present application and expressly incorporated herein by reference. In brief, an optimal detail level L is effectively the limit at which the resolution of image parcel data functionally exceeds the resolution of the client display. To determine the optimal detail level L, the viewpoint or camera position of the viewing frustum is determined relative to the displayed image. A nearest polygon P of level D is then determined from the effective altitude and attitude of the viewpoint. The nearest point A of the polygon P is then determined. The point A may be within the interior or an edge of the polygon P, though most likely be located at a vertex of the polygon P. The detail level at point A is then computed as the base-4 logarithm of the number of pixels on the screen that would be covered by a single pixel from the image parcel of level D if the K resolution image was used as a texture. The point A detail level is preferably computed analytically from the local value of the Jacobian of the projective transform used to transform the three dimensional image coordinate space to screen coordinates, evaluated at the point A.

Where the depth D of the polygon P is greater than the depth of the computed optimal level of detail L, the detail level L is taken as the optimal detail level L 190. Thus, through the process 140, an image parcel or corresponding section of the closest resolution image parcel associated with a parent node in the quad-tree data structure relative to the depth level L will be used as the texture for rendering the polygon P. Conversely, if the depth D is less than that of the optimal detail level L, the polygon P is effectively split into quadrants and the optimal level of detail is reevaluated. The process 180 thus continues iteratively until the optimal detail level L is found.

As part of the recursive evaluation of the optimal level of detail L, the image display space is progressively split 116 by four to one reductions into polygons. Quad-tree data structures holding existing image parcel data in the parcel data store 46 are concurrently traced 118 to establish a correspondence with the polygon map. Where the trace of a quad-tree data structure completes 120 to a node index of L for a polygon P, the node corresponding image parcel is associated with polygon P. The polygon P will not be further subdivided and no higher resolution image parcels will be requested for any portion of the image within the area represented by polygon P.

Where the trace reaches a maximum node index of D for a polygon P' 122, where N≦D<L and N is the index of the lowest resolution derivative image stored by the network server 12, 22, the image parcel associated with the node is associated with the polygon P'. This polygon P' will be subject to further subdivision and progressive requests for image parcels of higher resolution up to the detail level L.

The tessellation level of the depth reached by the quad-tree trace 118 for any polygons P, P' are recorded 124 as values in the tessellation map 100 positionally corresponding to the area of the polygons P, P'. Thus, the representative area of each polygon corresponding to an image parcel held by the client system 18, 20 is filled with the tessellation level of the corresponding image parcel. In the preferred embodiments of the present invention, the filling of polygon corresponding entries in the tessellation map 100 can be performed efficiently in, at worst, linear time proportional to the image size in pixels by filling entire scan lines of the map 100 using conventional optimized library functions such as memset.

In the preferred embodiments of the present invention, a separate rendering thread executes to process available image parcel data into video display memory. As indicated in FIG. 9, the rendering process 130 logically executes against a list of polygons P corresponding to the current image. The display image is rendered 130 based on the maximum depth D image parcel polygons currently present in the quad-tree data structure. Iterating over this set of maximum depth polygons, the process 130 skips 132 any polygons outside of the current viewing frustum. Polygons that are at least partially visible are clipped to the applicable bounds of the viewing frustum 134. The polygon corresponding image parcel data is then texture mapped 136 into the polygon corresponding coordinates of the video memory 70. If the node index depth of the rendered image parcel is at least equal to the prior determined optimal detail level L 138, the iteration over the polygons P continues.

Where the node index depth is less than the optimal detail level L 140, the D level polygon P is subdivided into four polygons P' of depth $D_{-1}$ and correspondingly represented by the creation of four child nodes within the associated quad-tree data structure 142. One or more image parcel download requests, corresponding to the polygons P', are then enqueued in the priority request queue 52 for issuance 144. The next polygon P is then considered in the loop of the image parcel rendering process 130.

When image parcels corresponding to the polygons P' are subsequently received 146, the parcels are stored in the previously allocated child nodes of the quad-tree data structure. Concurrently, the entries in the tessellation map 100 data structure are updated 148 to reflect the new tessellation level $D_{-1}$ of the polygons P'.

The detailed process 150 of rendering of an image parcel of tessellation level D over a polygon P in accordance with the present invention is shown in FIG. 10. The polygon rendering process 150 preferably operates with maximum computational efficiency to directly locate any possible T-junctions on the boarder of the polygon currently being rendered and insert a minimum number of additional vertices to remove the surface defects that would otherwise occur. To achieve this maximum computational efficiency, the present invention requires only an optimally minimum number of memory references to directly calculate the successive potential locations of T-junctions along the boarder of the current polygon. Consequently, implementation of the present invention adds little additional computational load to the rendering process and particularly avoids any necessity of complex, computative analysis of data from the quad-tree data structure, which would require an extensive number of memory references.

Thus, in accordance with the present invention, the rendering process 150 preferably initially determines 152 the tessellation level of the current polygon P through a lookup function T(P) that returns an entry value of the tessellation map corresponding to the area of the polygon P. A boarder scan of the polygon P relative to the tessellation map 100 is then performed 154. The polygon P covers the area [a1,a2)× [b1,b2) on the map 100, where the [x,y) notation indicates x inclusive, y exclusive. The boarder scan 154 effectively considers each of the polygon edge outside bounding intervals $I_{0-3}$, preferably in clockwise order, which are:

| [0073] | $l_0$ = [(a1,b1 − 1), (a2 − 1,b1 − 1)], |
| [0074] | $l_1$ = [(a2,b1), (a2,b2)], |
| [0075] | $l_2$ = [(a2 − 1,b2), (a1,b2)], and |
| [0076] | $l_3$ = [(a1 − 1,b2 − 1), (a1 − 1,b1)]. |

For each edge of the polygon P, only the discrete possible locations of a T-junction are then examined. According to the present invention, each such location is defined as occurring relative to a segment of the interval edge bordered by polygons of different tessellation levels and at a segment endpoint computationally determinable from the difference in tessellation level and image resolution. Possible T-junction points must lie between the end points of the current edge interval 156 and where the tessellation level of the bordering polygon P' is greater than that of the polygon P being rendered 158. The location of the segment endpoint is computed as an offset from the beginning point of the segment (initially a vertex of the edge interval) equal to the edge dimension of the bordering polygon P'. The bordering edge dimension is preferably calculated as N/(pow(2, T(P')−T(P))), where N is the minimum power of two that is greater than or equal to the maximum x or y resolution of the current image. A vertex located at the segment endpoint is then added to the set of vertices defining the polygon P.

The rendering process 150 next determines 160 if the boarder scan is complete. If the scan of the current edge interval is not complete, the next discrete location of a possible T-junction on the current edge is examined 162. If the scan of the current edge, but not all edges, is complete, the next edge is selected 164 for scanning. When all edges have been scanned, the polygon P is then decomposed, preferably subject to the merging of projection co-located vertices, and the resulting internal polygons are texture mapped 166 from the image parcel corresponding to the polygon P.

Table 1 provides a preferred pseudo-code implementation of the rendering process 150 for the polygon P relative to a single edge interval, defined as [(a1,b1−1), (a2−1,b1−1)]. The tessellation map 100 is represented by a data structure M with a logical array size of X×Y, where X and Y are the respective smallest powers of two greater than or equal to the x and y pixel resolutions of the current image. The lookup function T is an operator on M such that T(a,b) returns the tessellation level L at a,b in M.

TABLE 1

Vertex Insertion Routine

| | |
|---|---|
| Line 1 | // one time determine an image/polygon normalization value |
| Line 2 | N = min(power of 2 >= max(X, Y) of the image) |
| Line 3 | // once per edge, initialize a polygon edge offset pointer |
| Line 4 | a = a1; |
| Line 5 | /* once per polygon, set L0 to the current polygon's tessellation level */ |
| Line 6 | L0 = T(a1,b1); |
| Line 7 | While (a < a2) do // no vertex is added at a = a2 |
| Line 8 | If (a > a1) then // no vertex is added at a = a1 |
| Line 9 | add a vertex at the point location (a,b1); |
| Line 10 | End if |
| Line 11 | /*determine the tessellation level of the current external adjacent polygon */ |
| Line 12 | L = T(a,b1 − 1) |
| Line 13 | If (L < L0) then |
| Line 14 | /* adjacent polygon is "larger" than polygon P so no additional vertices need be added to this boarder of polygon P */ |
| Line 15 | Break from while loop; |
| Line 16 | End if |
| Line 17 | /* move pointer offset pointer to the next possible vertex insertion point on this boarder of polygon P based on delta tessellation */ |
| Line 18 | a = a + (N/(pow(2, L − L0)) |
| Line 19 | End while |

As demonstrated by the preferred implementation of the vertex insertion routine, the rendering process 150 of the present invention needs to examine an optimally minimal number of locations on each side of the polygon P for the potential occurrence of a T-junction. For most polygons, only one to two tessellation map entries will need to be accessed for each of the edge intervals that must be scanned, based on the likelihood that bordering polygons will have a delta tessellation level of one or less. Since the tessellation map accesses are mode from relatively close memory addresses, all bordering the area logically covered by the current polygon P, the map access can be performed as an immediate (O(1)) read and without requiring any read access to the quad-tree data structure. Due to the size and relative complexity of the quad-tree data structure, any comparable read access traversal of the quad-tree structure would effectively require indirect reads, proportional to O(D)=O(log (n)), where n is the image area, to move between adjacent structure nodes.

Consequently, the present invention is highly effective in efficiently locating a minimum set of additional vertices to be added to a polygon to preclude the occurrence of a surface rendering defect. While the present invention has been described particularly with reference to the display of images transmitted over the Internet, the present invention is equally applicable to the efficient display of images having improved image appearance independent of whether the image is transported over any communications network.

In view of the above description of the preferred embodiments of the present invention, many modifications and variations of the disclosed embodiments will be readily appreciated by those of skill in the art. It is therefore to be understood that, within the scope of the appended claims, the invention may be practiced otherwise than as specifically described above.

What is claimed is:

1. A method of regularizing a polygonal mesh having multiple tessellation levels for the topological rendering of image parcels, said method including the steps of:
    a) developing a map reflecting the topographically corresponding tessellation level of a multi-resolution polygonal mesh of defined size;
    b) determining, with respect to a first polygon of a first tessellation level and defined by a first set of vertices including vertices defining a first boarder, the occurrence of a second polygon relatively adjacent said first defined boarder having a second tessellation level greater than said first tessellation level by sampling a location within said map corresponding to said second polygon; and
    c) inserting an additional vertex into said first set of vertices, wherein said additional vertex corresponds to a point on said first boarder proportional to the difference between said first and second tessellation levels.

2. The method of claim 1 wherein said point is computationally determined based on the numerical difference between said first and second tessellation levels and the dimensions of said polygonal mesh.

3. The method of claim 2 wherein the dimensions of said polygonal mesh correspond to the maximum x and y resolution of an image that is to be rendered over said polygonal mesh and wherein said point is computationally determined to occur at a relative offset equal to N/(pow(2, L), where N is the minimum power of two that is greater than or equal the maximum x or y resolution of said image and L is the delta tessellation level between said second and said first polygons.

4. The method of claim 1 further comprising the steps of rendering a first image parcel to a surface defined by said first set of vertices including said additional vertex.

5. A method of regularizing a polygonal mesh to support the rendering of a topological surface, said method comprising the steps of:

a) determining a first tessellation level of a first polygon opposite a predetermined edge of a second polygon having a second tessellation level, wherein said second polygon is represented by a set of vertices and corresponds to an image parcel; and b) adding a vertex to said set of vertices at a location corresponding to a point along said predetermined edge proportional to the difference between said first and second tessellation levels provided said first tessellation level is greater than said first tessellation level.

6. The method of claim 5 further comprising the step of rendering said image parcel relative to said second polygon as defined by said set of vertices including said vertex.

7. The method of claim 6 wherein the tessellation of said first set of polygons is related to the tessellation of said second set of polygons by a function of a power of two.

8. The method of claim 7 wherein a defined projection of said predetermined edge has a length that is related by a factor of two to the length of said defined projection of a corresponding edge of said first polygon.

9. A method of removing defects in a tessellated polygonal mesh provided for the rendering of polygon corresponding image parcels, said method comprising the steps of:

a) determining, for a predetermined segment of a first edge of a first polygon within said polygonal mesh, a difference in tessellation level between said first polygon and a second polygon disposed adjacent said predetermined edge of said first polygon subject to the occurrence of a defect in said polygonal mesh between said first and second polygons;

b) computing, for said predetermined segment, a terminus of said predetermined segment based on said difference in said tessellation levels; and c) adding a new vertex, corresponding to said terminus, to a first set of vertices that define said first polygon.

10. The method of claim 9 wherein said new vertex corresponds to a predefined vertex within a second set of vertices that define said second polygon and wherein said method further comprising the steps of:

a) merging said new vertex with said predefined vertex; and b) rendering a first image parcel based on said set of vertices including said new vertex such that said first image parcel as rendered covers said defect in said polygonal mesh between said first and second polygons.

11. The method of claim 10 wherein said steps of determining, computing and adding are repeated for successive segments of said first edge of said first polygon with respect to successive polygons respectively disposed adjacent said successive segments subject to the occurrence of said defect between said successive polygons and said first polygon, wherein said predetermined segment is any one of said successive segments and said second polygon is any one of said successive polygons.

12. The method of claim 11 further comprising the step of establishing a tessellation map providing for the storage of a plurality of tessellation values, wherein said tessellation map is provided with a resolution corresponding to the maximum tessellation level of said polygonal mesh, wherein said plurality of tessellation values reflect the tessellation level of regions of said polygonal mesh, and wherein said step of determining includes an access of said tessellation map to retrieve a predetermined tessellation value corresponding to said second polygon.

13. The method of claim 12 wherein said access of said tessellation map is atomic.

14. The method of claim 13 wherein said step of computing directly calculates the location of said terminus of said predetermined segment based on the difference in tessellation levels between said second polygon and said first polygon and a predetermined image resolution value.

15. The method of claim 14 wherein said predetermined image resolution value is determined as the minimum power of two that is greater than or equal to the greater of the X and Y dimensions of a predetermined image that is to be rendered over said polygonal mesh.

16. The method of claim 15 wherein the location of said terminus, denoted a2, is computed relative to the incept point of said predetermined segment, denoted a1, as a2=a1+ (N/pow(2, L)), where N is said predetermined image resolution value and L is said difference in tessellation level between said second polygon and said first polygon.

17. The method of claim 16 wherein said step of adding is performed provided said terminus lies between the vertices of said set of vertices that define said first edge.

18. The method of claim 17 wherein said steps of determining, computing and adding are repeated for each edge of said first polygon.

19. A method of regularizing a polygonal mesh provided as topological basis for the rendering of a multi-resolution image, said method comprising the steps of:

a) maintaining a tessellation map including a plurality of entries representing the tessellation levels within a defined portion of said polygonal mesh;

b) selecting a first polygon for rendering, said first polygon being defined by a set of vertices within said defined portion, said first polygon including a first edge having a defined segment bordered by a second polygon;

c) accessing said tessellation map to determine a difference in tessellation level between said first and second polygons;

d) computationally determining an endpoint of said defined segment within said first edge based on said difference in tessellation level, wherein said endpoint is positionally opposite a T-junction vertex in said second polygon;

e) inserting a vertex, corresponding to said endpoint, into said set of vertices;

f) merging the location of said vertex with that of said T-junction vertex; and g) rendering said first polygon based on said set of vertices.

20. The method of claim 19 wherein said step of maintaining provides for the maintenance of said plurality of entries in correspondence with a plurality of image parcels, such that for a polygon a,b in said polygonal mesh, a function T on said tessellation map returns the tessellation level of a image parcel renderable over said polygon a,b.

* * * * *